July 2, 1929.  P. E. H. GRIPON  1,719,293
AIRFOIL
Filed Aug. 3, 1928    3 Sheets-Sheet 1

INVENTOR.
BY PAUL E. H. GRIPON.
Herman Jakobson
ATTORNEY.

July 2, 1929.　　　P. E. H. GRIPON　　　1,719,293
AIRFOIL
Filed Aug. 3, 1928　　　3 Sheets-Sheet 2
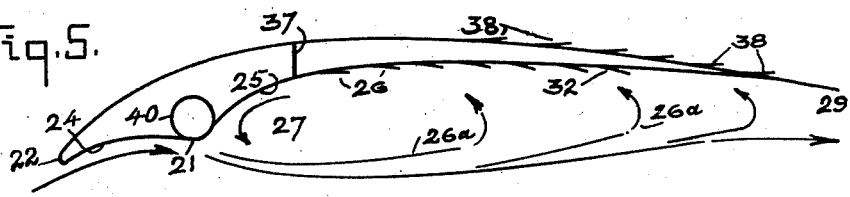
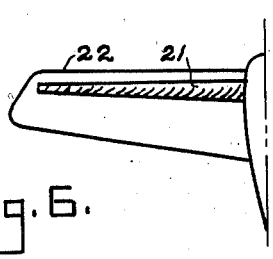
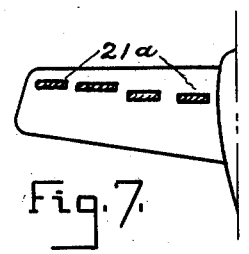
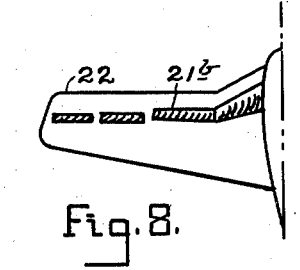
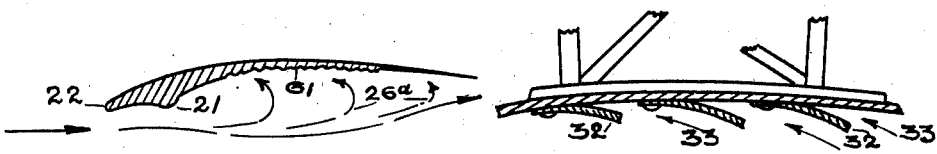
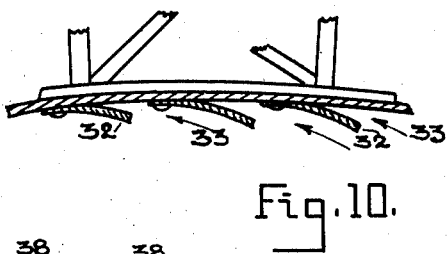
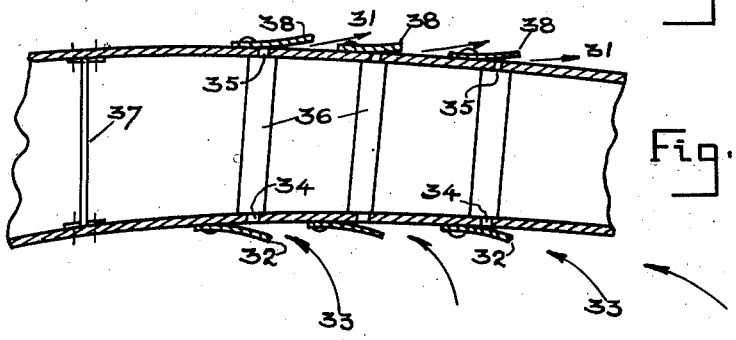
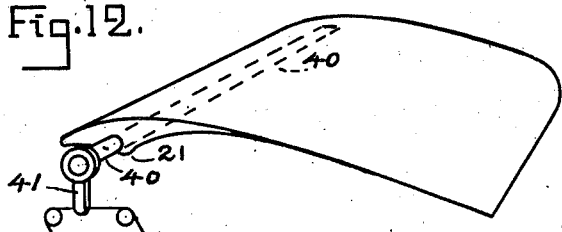
INVENTOR.
PAUL E. H. GRIPON.
BY
ATTORNEY.

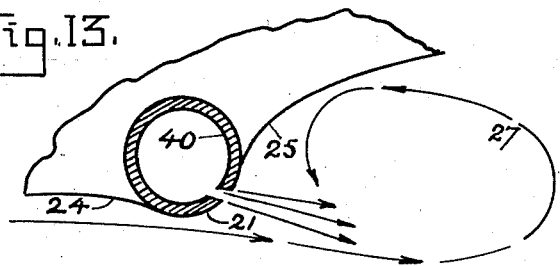
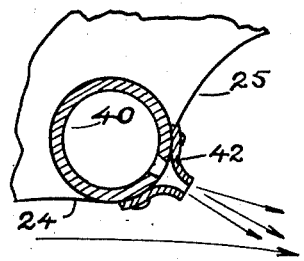
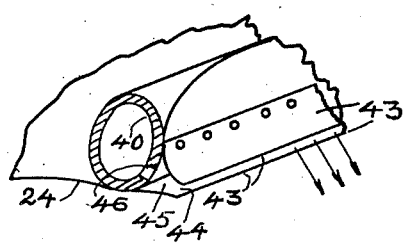
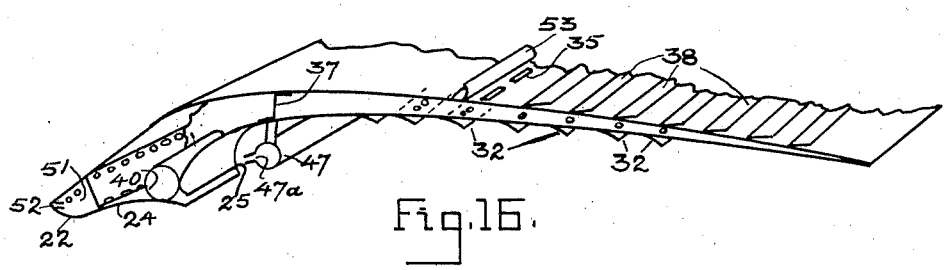
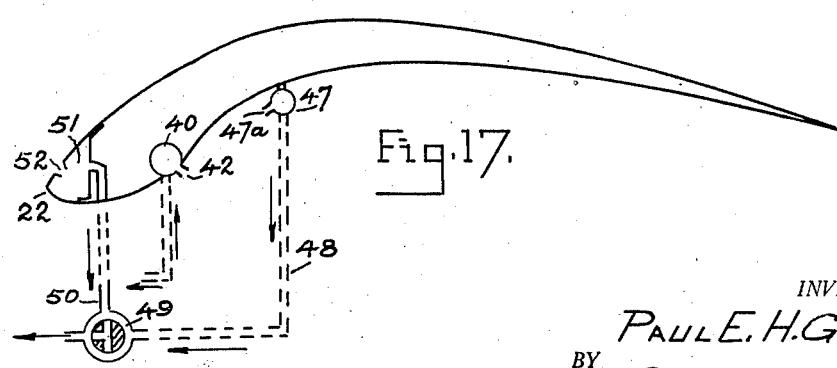

Patented July 2, 1929.

1,719,293

UNITED STATES PATENT OFFICE.

PAUL E. H. GRIPON, OF WASHINGTON, DISTRICT OF COLUMBIA.

AIRFOIL.

Application filed August 3, 1928. Serial No. 297,293.

In this specification the term "airfoil" means any surface designed to be subjected to fluid streams, in order to produce a useful dynamic reaction.

The invention relates to the formation, utilization and control on airfoil surfaces of vortices of a surrounding fluid, with the object of reducing to the smallest possible degree the "drag" or resistance normally encountered when said airfoil is in relative motion comparatively to that fluid.

Figures 1 and 2 give cross-sections of the present airfoils such as are used for wings on airplanes.

Figure 5 is a diagrammatic cross-section of my airfoil, built to imitate the actions and reactions encountered in a bird's wing when in gliding flight.

Figures 6, 7 and 8 show some possible dispositions, under an airplane wing, of a protuberance which is part of the invention.

Figure 9 shows the action of a whirl on coarse material intended to utilize said whirl.

Figure 10 is a detailed view of bands installed for the same purpose.

Figure 11 is a detailed view of partial cross-section of my airfoil, showing utilization of some actions and reactions of fluid streams.

Figure 12 is a diagrammatic view of a possibly movable tube in my invention.

Figures 13, 14 and 15 are views of holes, nozzles or slots respectively.

Figure 16 is a diagrammatic cross-section of my airfoil completed with nozzles for impinging air, and with aspirating intake.

Figure 17 is a diagrammatic view of the fluid blowing installation and piping.

Figures 1, 2:

Heretofore, airfoils have been designed in such shapes as to afford a free sweeping of their surfaces by fluid currents, Fig. 1. Nevertheless, the airfoils, such as the ones used at present as wings on flying machines, have a low ratio between "lift" and "drag" and are sustained in the air only through vast expenditures of power.

Concavo-convex surfaces give a very satisfactory "lift" but also entail a high "drag". The shape which gives such general results is that of Fig. 2. It is to be noted that the concave surface is smooth and generally of circular or parabolic type of curve.

Figure 3:
Figure 3 is the cross-section of a bird's wing.
Figure 4:
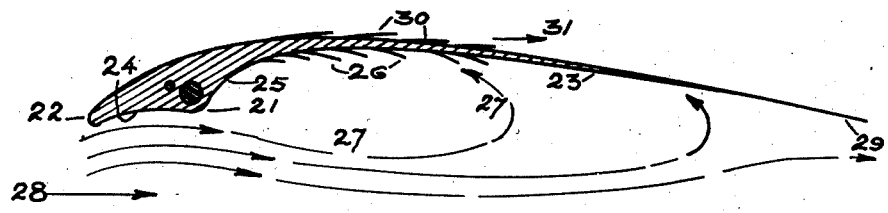
Figure 4 shows the diagrammatic cross-section of the wing of a bird, when in gliding flight, Fig. 4ª the expanded wing of a bird viewed from below.
Figure 4A:
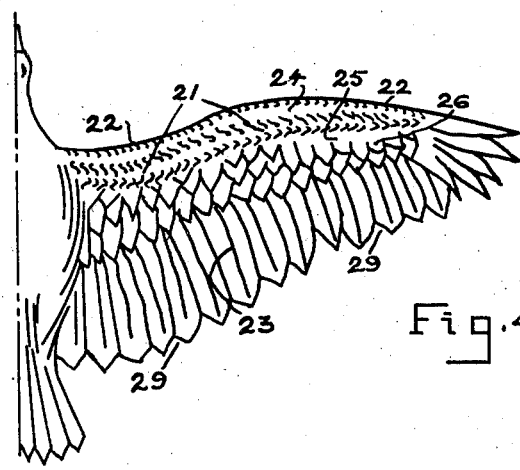

If we consider sailing-bird's wing, which is highly efficient, especially in regard to the "drag", we find that the wing which has heretofore been represented and tested with cross-section as in Fig. 3 and free sweeping air streams, is really of the form shown in Fig. 4, when in gliding flight.

The protuberance 21 is created by the bones of the wing and extends substantially parallel to the leading edge 22. This protuberance 21 is connected to the leading edge 22 and to the lower surface of the flight feathers 23 by curves 24 and 25, furred at some places with very smooth and very tender down and bearing short and flexible covert-feathers 26. Only the covert-feathers of the rear part are indicated.

Aerodynamic studies indicate that when a protuberance of a shape similar to the one shown by 21 in Fig. 4 is located under a surface, a whirl takes place in the region marked 27, said whirl having a somewhat cylindrical form whose axis is substantially parallel to the surface and normal to the direction of fluid motion shown by the arrow 28. In that region, marked 27, when such a model is subjected to a fluid current coming in the direction of the arrow 28, and as long as the current continues, a sort of roll of fluid extends along the span of the model behind the protuberance 21. The speed and volume of that "fluid roll" are complex functions of certain values such as the form of the protuberance 21, the form of the surfaces adjacent to 21, the speed, the angle of incidence, and so forth. It is plainly to be seen that a sailing bird fitted with such an airfoil as a sustaining surface can take advantage, by fine adjustments, of every condition offered to it by the wind, and especially that it can recuperate a great part of the momentum which has been imparted to the air streams by the bird's motion through them. The effect of the "air roll" whirling at high speed in 27, is to: first suppress the friction or "drag" of the boundary layer of air in the region of the feathers marked 26, 26, 26, 23; second, replace it by an inverted and increased friction or "negative drag", which tends, with correct adjustments, to compensate the usual positive total drag of the airfoil and which maintains the forward impetus necessary for sailing flight without forcing the bird to resort to flapping flight. In other words, the wing of the bird, instead of gliding on a layer of air which comes in a direction opposed to its proper motion, rides literally on a "roll" of air which moves in the direction of flight. This is clearly shown by the curved arrows in Fig. 4.

It is also clear that the effect of the whirl is to create under the wing a somewhat normal action which tends to increase the "lift."

The effect of the whirl is also to ruffle slightly the covert-feathers of the lower surface which overlap on the quills of the flight-feathers or "remiges" 23. The air under pressure passes between the quills and through the down which surrounds them and lifts a part of the upper covert-feathers 30 to escape tangentially as shown by small arrows 31 in Fig. 4. This produces a new reaction which adds its effect to the forward pushing.

Having thus established concisely the effects which take place under a bird's wing when in gliding flight, I shall now describe my invention, which is intended to provide an airfoil with means to effect the following:

A. Creation of a roll of air under the airfoil;

B. Utilization of this roll of air for reducing the "drag";

C. Control of this roll, i. e. increase or decrease of its momentum.

A. Creation of a roll of air.

An airfoil such as the one shown in cross-section in Fig. 5 when in relative motion through a fluid, will develop behind the protuberance 21 a whirl as previously described. This protuberance being a part of the profile extends through the span of the airfoil and is connected to the leading edge 22 and the rear part of the lower surface by appropriate curves 24 and 25. A preferred form is that which is shown in Fig. 6 where the protuberance or ledge goes tapering towards the tip of the airfoil. The protuberance or ledge may be transversely continuous 21, or divided in parts consecutively laid 21$^a$, or laid in various formations 21$^b$, as tentatively shown in Figures 7 and 8. Figs. 6, 7 and 8 show the lower surface of the airfoil (as applied to the wing of an airplane).

B. Utilization of this roll of air for reducing the drag.

1. In my invention the surface subjected to the whirl, in the region marked 26, 26, 26 is made up of coarse, rugged, corrugated, hairy or other such material, 61 (Fig. 9), whose action is to offer resistance to the motion of the upper part of the whirl, and to transmit to the airfoil most of the dynamic momentum of said whirl. This is represented in Fig. 9 by the curved arrows 26$^a$.

2. I fix under the lower surface of the airfoil narrow transverse bands or pieces of flexible material 32, Fig. 10, (silk, percale, duralumin, celluloid, cellophane, etc.), which can form pockets or cups opening toward the trailing edge. Those pockets or cups, as well as the lower surface proper utilize the forward dynamic momentum of the rushing upper part of the whirl; this action pushes the wing forward, and is to be added to that of the skin friction which takes place in 26, 26, 26 following the little arrows, 33. The bands 32 may be fixed in any manner to the lower surface (screwed, glued, sewn, hinged, etc.) provided that they be open or free to open toward the trailing edge.

3. Along the portions of the lower surface of the airfoil which are covered by the strips or cups already mentioned, holes or transverse slots 34, Fig. 11, are pierced, and connected to holes or transverse slots 35 (Fig. 11) in the upper surface by ducts 36. The ducts may also be simply formed by the inner space limited by the upper and lower surfaces of the airfoil, if care has been taken to provide an air-tight partition such as 37, Figs. 5, 11 and 16, in the structure of the airfoil. The holes 35 of the upper surface are masked by narrow bands or pieces or cups 38 similar to those of the lower surface, so that the fluid from the rushing upper part of the whirl may come through the duct or ducts 36, bulge the bands or cups 38 and escape following the arrows 31, thus adding its effect of reaction to the reduction of the drag of the airfoil. Fig. 16 shows one of the bands 53 raised and bent forward to show the holes 35. (It will be seen later that my invention provides for an increase of the quantity of fluid in motion under the airfoil, allowing such a derivation of fluid, without loss of lift.)

C. Control of the roll of air.

In my invention, the protuberance 21 is formed by or contains a tube 40 (Fig. 5) which is part of the girding of the airfoil, or which can be made to rotate around its axis by means of a lever 41 (Fig. 12) manipulated by any automatic system or at will by the pilot. This tube 40 receives air (or any gas) under pressure coming from any suitable source. This tube 40 is pierced along a proper generatrix towards the rear with holes that are preferably drilled as shown in Fig. 13. Another very suitable form is shown in Fig. 14 and constitutes an ordinary nozzle, 42. Still another form is shown in Fig. 15 where the two curved bands 43 fixed on the tube are separated by a gap or slot 44 of suitable dimensions. The chamber 45 comprised between the curved bands 43 and the periphery of the tube communicates with the inner part of the tube by holes 46 pierced in any manner. The streams of air or gas at high velocity escaping through the holes, nozzles or slots, and impinging on the whirl give to this whirl a large increase in momentum, which in turn imparts a great impulse to the lower surface of the airfoil, as described hereabove.

In order to retain the whirls under the airfoil and still increase their speed, it is necessary to return the air to the intake of the compressing apparatus. In order to do so, a second tube 47 is placed at a proper point where it is fixed by suitable hangers, below the lower surface of the airfoil, being so located as to be in one of the centers of the whirl, preferably the forward one.

This tube 47 is pierced with holes, or fitted with nozzles or slots 47ª, preferably in the forward part of it, and connected to the intake of any suitable compressing apparatus, the connection 48 being fitted with a valve 49 and also with a direct aspiration 50 to the surrounding fluid (Fig. 17). The two aspirations 48 and 50 are arranged in such a manner as to be changed with regard to the intake by any automatic device, or at the will of the pilot.

A very convenient place for aspiration to the surrounding air is the forward part of the upper surface of the airfoil, where the dynamic pressure of the fluid reaches its highest point. So that, by connecting the duct 50 to a chamber 51 provided in the nose of the airfoil, it is possible by proper holes or slots 52, to suck a fluid which is already slightly compressed. The presence of the tube 47 in the center of the whirl will increase the phenomenon of circulation in that region. It is clear that the proper manipulation of the intake register or valve 49 of the compressing apparatus permits any adjustment of the whirl, as to its volume and its speed.

It is to be understood that the invention as here described is not limited to the details of construction disclosed and shown and that these may be varied widely without departing from the spirit of the invention as defined by the claims.

Having thus described my invention, I claim:

1. An airfoil provided with a ledge in the forward part of its under surface, flow obstructing elements on said under surface adapted to resist forward motion of fluid in the upper part of a whirl provoked by said ledge, and vents in the airfoil permitting upward escape of the fluid.

2. An airfoil provided with a transverse ledge in the front part of its lower surface, provoking a whirl under said surface and associated with obstruction elements on said surface in the region of said whirl, the airfoil having ducts covered by said elements and connecting said region with the upper surface of the airfoil, and other similar elements covering the opening of said ducts on the upper surface, said elements being attached to the airfoil at their forward edges and free to open toward their rear edges.

3. An airfoil provided with a transverse ledge provoking a whirl under its lower surface, apertures being furnished in the ledge adapted to impinge fluid under pressure on the lower part of the whirl to increase the speed thereof, and a transverse intake member adapted to suck the fluid from the upper part of said whirl.

4. An airfoil provided with a transverse ledge provoking a whirl under its lower surface, apertures being furnished in said ledge adapted for impinging fluid under pressure against the lower part of the whirl, and a transverse intake member adapted to suck fluid from the upper side of the whirl, said member being situated adjacent the whirl center.

5. In an airfoil, a transverse protuberance on the under surface thereof provoking a whirl, means for regulating the revolving speed of whirling fluid, and other means adapted to conduct forwardly flowing fluid from said under surface to the upper surface of the airfoil and then reversing the direction of its flow.

6. In an airfoil, a transverse protuberance on the under surface thereof provoking a whirl, means for regulating the revolving speed of the whirling fluid; said means comprising a tubular member revolubly mounted in said protuberance and provided with apertures facing in the direction of the whirl.

7. In an airfoil, a transverse protuberance on the under surface thereof provoking a whirl, means for regulating the whirling speed of the fluid; said means comprising tubular members having apertures facing in the direction of the whirl, said members being connected with fluid compressing and fluid rarefying sources, respectively.

PAUL E. H. GRIPON.